United States Patent
Sambale

(10) Patent No.: US 11,582,747 B2
(45) Date of Patent: Feb. 14, 2023

(54) ROAD-SIDE NETWORK NODE, METHOD TO OPERATE THE ROAD-SIDE NODE, NETWORK INFRASTRUCTURE NODE, METHOD TO OPERATE THE NETWORK INFRASTRUCTURE NODE, AND NETWORK SETUP

(71) Applicant: Robert Bosch GmbH, Stuttgart (DE)

(72) Inventor: Klaus Sambale, Oberhausen (DE)

(73) Assignee: Robert Bosch GmbH, Stuttgart (DE)

( * ) Notice: Subject to any disclaimer, the term of this patent is extended or adjusted under 35 U.S.C. 154(b) by 178 days.

(21) Appl. No.: 16/753,130

(22) PCT Filed: Sep. 20, 2018

(86) PCT No.: PCT/EP2018/075463
§ 371 (c)(1),
(2) Date: Apr. 2, 2020

(87) PCT Pub. No.: WO2019/091651
PCT Pub. Date: May 16, 2019

(65) Prior Publication Data
US 2020/0296722 A1 Sep. 17, 2020

(30) Foreign Application Priority Data

Nov. 13, 2017 (EP) .................................... 17201344

(51) Int. Cl.
*H04W 4/44* (2018.01)
*H04W 72/04* (2009.01)
*H04W 72/0446* (2023.01)

(52) U.S. Cl.
CPC ......... *H04W 72/0446* (2013.01); *H04W 4/44* (2018.02)

(58) Field of Classification Search
None
See application file for complete search history.

(56) References Cited

U.S. PATENT DOCUMENTS

| | | |
|---|---|---|
| 2015/0195849 A1 | 7/2015 | Bashar et al. |
| 2015/0382374 A1 | 12/2015 | Bhorkar et al. |
| 2017/0280445 A1 | 9/2017 | Jiang et al. |
| 2018/0049143 A1* | 2/2018 | Gupta ............... H04W 74/0808 |

(Continued)

FOREIGN PATENT DOCUMENTS

| | | |
|---|---|---|
| WO | 2012049533 A1 | 4/2012 |
| WO | 2017030338 A1 | 2/2017 |
| WO | 2017077034 A1 | 5/2017 |

OTHER PUBLICATIONS

International Search Report for PCT/EP2018/075463, dated Oct. 9, 2018.
Samsung: "Interlaced transmissions for co-existence with DSRC", 3GPP Draft; R1-164792 Interlaced Transmissions for Co-Existence With DSRC, 3rd Generation Partnership Project (SGPP), Mobile Competence Centre; 650, Route Des Lucioles; F-06921 Sophia-Antipolis Cede. pp. 1-15, vol. RAN WG1, No. Nanjing; May 23, 2016-May 27, 2016 May 13, 2016 (May 13, 2016), XP051096708, Retrieved from the Internet: URL:http://www.3gpp.org/ftp/tsg_ran/WG1_RL1/TSGR1_85/Docs/ [retrieved on May 13, 2016].

(Continued)

*Primary Examiner* — Duc T Duong
(74) *Attorney, Agent, or Firm* — Norton Rose Fulbright US LLP; Gerard Messina

(57) ABSTRACT

A road-side network node for operating in a cell-supported radio communications network is provided. The road-side network node comprises a processor, a memory, a radio module, and an antenna. The road-side network node is configured to: determine or receive a gap information indicating a transmission gap period on a sidelink radio channel; and transmit an energy signature via the sidelink radio channel within the transmission gap period.

20 Claims, 6 Drawing Sheets

(56) References Cited

U.S. PATENT DOCUMENTS

| | | | | |
|---|---|---|---|---|
| 2018/0070252 | A1* | 3/2018 | Gupta | H04W 48/16 |
| 2018/0167820 | A1* | 6/2018 | Belleschi | H04W 72/044 |
| 2018/0227972 | A1* | 8/2018 | Tsuboi | H04W 8/00 |
| 2018/0227973 | A1* | 8/2018 | Tsuboi | H04W 72/042 |
| 2018/0255532 | A1* | 9/2018 | Li | H04L 5/0055 |
| 2018/0263019 | A1* | 9/2018 | Jung | H04W 72/04 |
| 2018/0302779 | A1* | 10/2018 | Fujishiro | H04W 92/18 |
| 2018/0317278 | A1* | 11/2018 | Fujishiro | H04W 76/28 |
| 2018/0343627 | A1* | 11/2018 | Thangarasa | H04W 4/80 |
| 2019/0014564 | A1* | 1/2019 | Lee | H04L 5/0082 |
| 2019/0058986 | A1* | 2/2019 | Loehr | H04L 1/1825 |
| 2019/0141650 | A1* | 5/2019 | Lim | H04W 56/001 |
| 2019/0174530 | A1* | 6/2019 | Kim | H04W 72/12 |
| 2020/0008030 | A1* | 1/2020 | Kim | H04L 5/003 |

OTHER PUBLICATIONS

3GPP TS 36.300 V14.2.0 (Mar. 2017), 330 pages.
"802.11P-2010—IEEE Standard for Information Technology—Local and Metropolitan Area Networks—Specific Requirements—Part 11: Wireless LAN Medium Access Control (MAC) and Physical Layer (PHY) Specifications, Amendment 6: Wireless Access in Vehicular Environments", 51 pages.
ETSI EN 302 663 V1.2.0 (Nov. 2012), 24 pages.
ETSI TS 102 687 V1.1.1 (Jul. 2011), 45 pages.

* cited by examiner

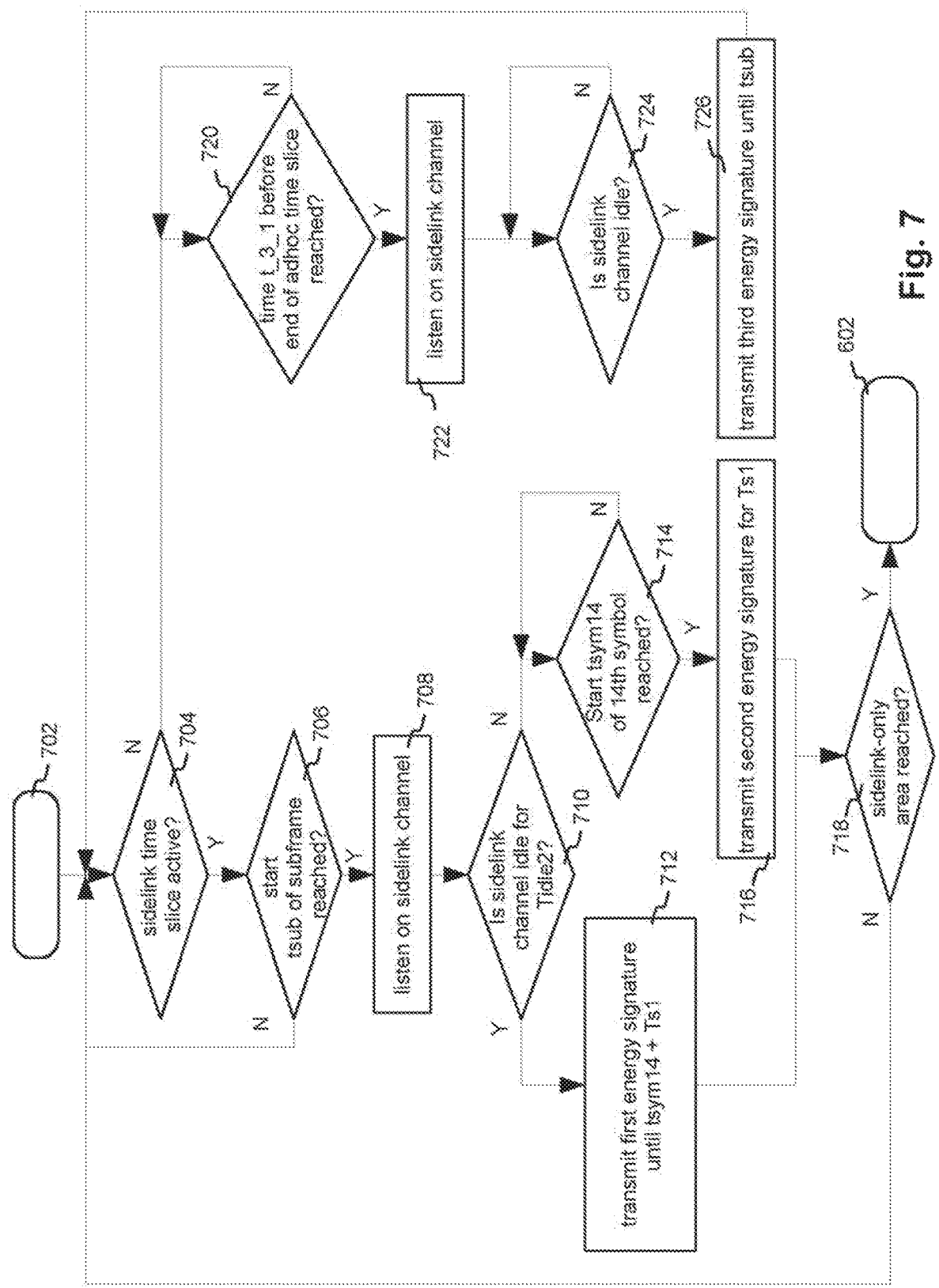

ROAD-SIDE NETWORK NODE, METHOD TO OPERATE THE ROAD-SIDE NODE, NETWORK INFRASTRUCTURE NODE, METHOD TO OPERATE THE NETWORK INFRASTRUCTURE NODE, AND NETWORK SETUP

FIELD

The present invention is directed to a road-side network node, a method to operate the road-side node, a network infrastructure node, a method to operate the network infrastructure node, and a network setup.

BACKGROUND INFORMATION

State-of-the-art vehicles are able to exchange information with other vehicles in their vicinity (V2V: Vehicle to Vehicle). Also, vehicles with roadside infrastructure can communicate wirelessly (V2I: Vehicle to Infrastructure). Likewise, the vehicle can communicate wirelessly with a backend server in the Internet (V2N: Vehicle to Network) or with a pedestrian terminal (V2P: Vehicle to Person). Overall, this communication is referred to as Vehicle-to-Everything (V2X).

The development of new functions and services in the automotive industry such as automated driving benefits from V2X. Road safety, ride comfort and energy and traffic efficiency can be improved. This leads to new products and business models for automakers, automotive suppliers and other service providers.

The first generation of V2X applications to be deployed in the coming years is primarily related to road application. Their goal is to provide the driver with information about the road environment. Vehicles periodically provide status information (e.g., position, speed, acceleration, etc.) and/or event information (rescue mission, vehicle stagnant, traffic jam). This information is usually issued locally in the form of text messages. From neighboring vehicles, this event-based information can be sent to a central network unit (base station, backend).

SUMMARY

In accordance with the present invention, an example road-side network node, an example method to operate the road-side node, an example network infrastructure node, an example method to operate the network infrastructure node, and an example network setup are provided.

According to a first aspect of the present invention, an example road-side network node for operating in a cell-supported radio communications network is provided. The road-side network node comprises a processor, a memory, a radio module, and an antenna. The road-side network node is configured to: determine or receive a gap information indicating a transmission gap period on a sidelink radio channel; and transmit an energy signature via the sidelink radio channel within the transmission gap period.

This provides an advantage when an adhoc radio channel overlaps with the sidelink radio channel in frequency. Due to reception of an energy above a threshold level, which is caused by the transmission of the energy signature, network nodes trying to access the adhoc radio channel will sense the adhoc radio channel as busy. As these network nodes sense the adhoc radio channel as busy they will refrain from transmitting a signal via the adhoc radio channel. So, access to the adhoc radio channel and the sidelink radio channel is provided in a time-division multiplex manner. Moreover, the LBT-procedure of the adhoc-capable network nodes may remain untouched. So, 802.11p legacy network nodes are capable of accessing the adhoc radio channel in a TDM manner.

According to advantageous embodiment of the present invention, the road-side network node is configured to: determine a sidelink TDM-channel in dependence on a resource pool, wherein the sidelink TDM-channel exclusively reserved for communication via the sidelink radio channel; and determine the gap information only during the sidelink TDM-channel.

Advantageously the provision of sidelink time slices in the sense of the sidelink TDM-channel enables a time division multiplex access of the same frequency resources via the sidelink radio channel and the adhoc radio channel.

According to advantageous embodiment of the present invention, the road-side network node is configured to: determine a start of a subframe of the sidelink radio channel; determine whether the sidelink radio channel is idle after the start of the subframe; and transmit the energy signature upon determining the sidelink radio channel after the start of the subframe as idle. This still prevents adhoc-capable devices from accessing the channel.

According to advantageous embodiment of the present invention, the road-side network node is configured to: determine that the sidelink radio channel is idle for at least 30 µs, in particular at least 20 µs, and in particular at least 15 µs beginning with the start of subframe; and start the transmission of the energy signature upon determining the sidelink radio channel as idle since the start of the subframe.

The idle time of at least 15 µs, in particular at least 20 µs, and in particular at least 30 µs is considered sufficient to compensate for signal propagation delays and processing time. On the other hand, it is ensured that network nodes trying to access the adhoc radio channel are blocked to do so.

According to advantageous embodiment of the present invention, the road-side network node is configured to receive a gap information via a downlink channel from a network infrastructure node.

In accordance with the present invention, the cell-wide distribution of gap information reduces processing effort on the side of the network nodes and increases resource efficiency on the radio interface.

According to advantageous embodiment of the present invention, the road-side network node is configured to: determine randomly a transmission probability; and determine a threshold in dependence on the number of further road-side network nodes of the cell-supported radio communications network in the vicinity of the road-side network node; transmit the energy signature via the sidelink radio channel within the transmission gap period only if the transmission probability is above the threshold.

Advantageously, not all sidelink-capable network nodes are filling the sidelink radio channel with energy signatures as a certain energy level is sufficient for preventing a use of the adhoc radio channel.

According to advantageous embodiment of the present invention, the energy signature comprises an a-priori known signature. The a-priori known signature allows other road-side network nodes to predict future gaps for a possible sidelink transmission According to advantageous embodiment of the present invention, the road-side network node is configured to: determine a start of a guard period towards the end of a subframe; transmit a second energy signature during the guard period.

Reducing the legacy guard period by transmitting the second energy signature does not compromise the access or transmission range of the sidelink radio channel. On the other hand, due to reception of an energy above a threshold level, which is caused by the transmission of second energy signature, the network nodes trying to access the adhoc radio channel sense the adhoc radio channel as busy. As these network nodes sense the adhoc radio channel as busy they will refrain from sending a signal via the adhoc radio channel.

According to advantageous embodiment of the present invention, the time period starting at the end of the transmission of the second energy signature and ending at the start of the transmission of the subsequent energy signature is smaller than 100 µs, preferably smaller than 80 µs, preferably smaller than 60 µs, and preferably smaller than 58 µs.

The listen-before talk algorithm will advantageously refrain from accessing the channel as at least 58 µs are necessary to determine the adhoc radio channel as idle. If the time period is smaller than 100 µs, the collision probability is still on an acceptable level.

According to advantageous embodiment of the present invention, the road-side network node is configured to: determine a non-sidelink TDM-channel in dependence on the resource pool, wherein the non-sidelink TDM-channel is exclusively reserved for communication via the sidelink radio channel; start listening the sidelink radio channel before the end of a time-slice of the non-sidelink TDM-channel; determine whether the sidelink radio channel is idle; transmit a third energy signature until an end of the time slice of the non-sidelink TDM-channel when the sidelink radio channel gets idle.

According to a second aspect of the present invention, an example method to operate a road-side network node for operating in a cell-supported radio communications network is provided, the method comprising: determining or receiving a gap information indicating a transmission gap period on a sidelink radio channel; and transmit an energy signature via the sidelink radio channel within the transmission gap period.

According to a further aspect of the present invention, an example network infrastructure node for operating in a cell-supported radio communications network is provided. The network infrastructure node comprises a processor, a memory, a radio module, and an antenna. The network infrastructure node is configured to: determine a gap information indicating a transmission gap period in a sidelink radio channel; and transmit the gap information to at least one road-side network node via a downlink channel.

According to advantageous embodiment of the present invention, the network infrastructure node is configured to: schedule sidelink resources for a plurality of road-side network nodes; determine the gap information in dependence on the scheduled sidelink resources and in dependence on a resource pool, the resource pool comprising sidelink resources exclusively reserved for scheduling on the sidelink, particularly determine the gap information by XOR-ing the scheduled sidelink resources and the resource pool.

According to a further aspect of the present invention, an example method to operate a network infrastructure node of a cell-supported radio communications network is provided. The method comprises: determining a gap information indicating a transmission gap period in a sidelink radio channel; and transmitting the gap information to at least one road-side network node via a downlink channel.

According to a further aspect of the present invention, an example network setup is provided, which comprises: a cell-supported radio communications network with road-side network nodes, each according to one of the previous aspects; an adhoc radio communications network with second road-side network nodes, wherein an adhoc radio channel of the adhoc radio communications network and the sidelink radio channel of the cell-supported radio communications network overlap at least partly in frequency. Each of the second road-side network nodes are configured to: sense a non-idle state of the adhoc radio channel during a sequential transmission of data signals and/or blocking signals via the sidelink radio channel; sense an idle state of the adhoc radio channel; and transmit a data signal via the adhoc radio channel if the adhoc radio channel is sensed idle.

Further features and advantages are of the present invention are described herein.

BRIEF DESCRIPTION OF THE DRAWINGS

FIG. 7 depicts a schematic flow chart to operate the road-side network node.

DETAILED DESCRIPTION OF EXAMPLE EMBODIMENTS

Figure 1:
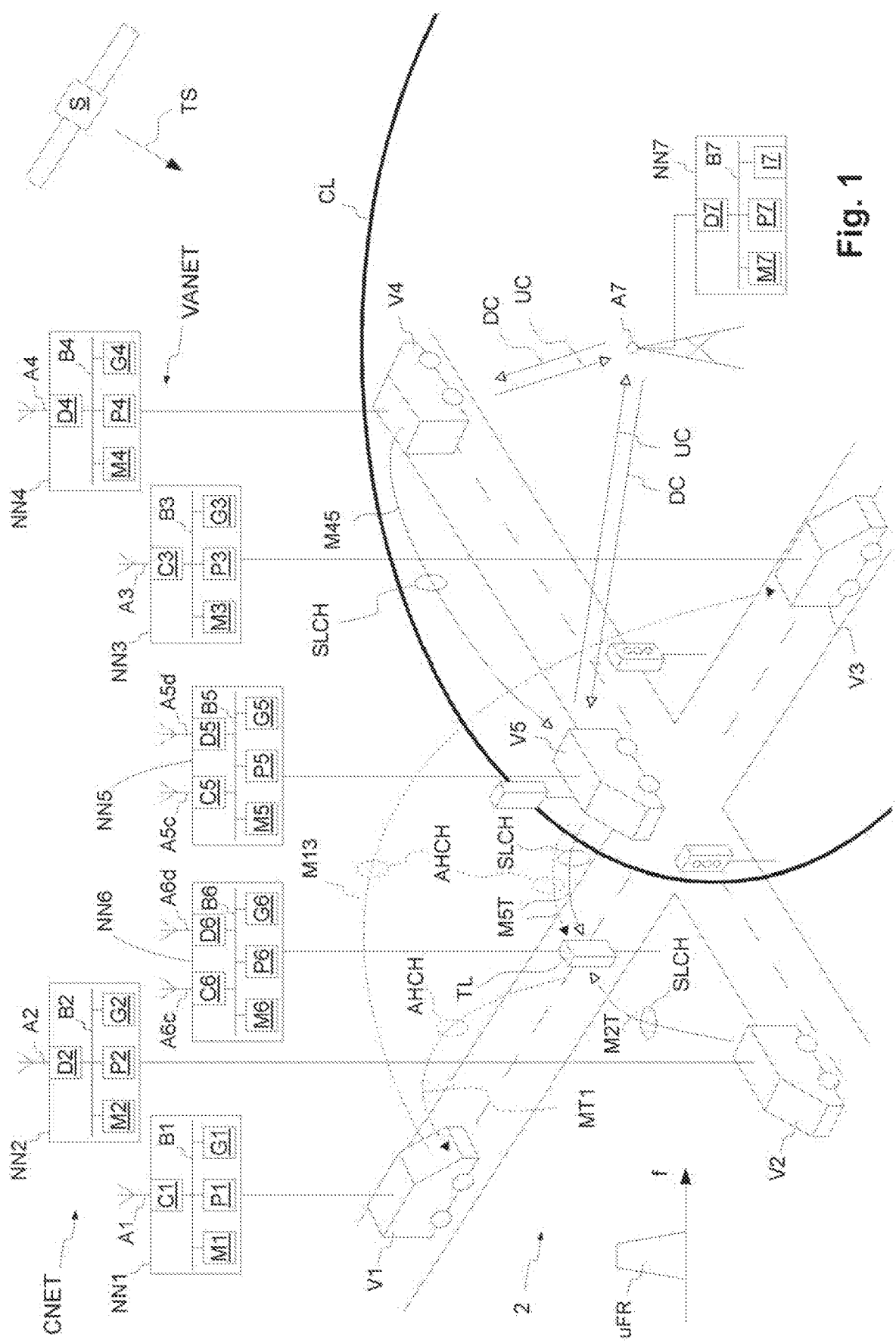
FIG. 1 depicts a schematic perspective view of an exemplary traffic situation.

FIG. 1 depicts a schematic perspective view of an exemplary traffic Situation around a traffic lights crossing 2. Each vehicle V1, V3 comprises a network node NN1, NN3 forming an adhoc radio communications network VANET. Each vehicle V2, V4 comprises a network node NN2, NN4, which form a cell-supported radio communications network CNET. A vehicle V5 and a traffic light TL comprise a network node NN5, NN6, which are configured to participate in the adhoc radio communications network VANET and the cell-supported radio communications network CNET. Of course also other fixed infrastructure entities besides traffic lights may comprise a network node like NN1, NN2, or NN6.

Each one of network nodes NN1, NN2, NN3, NN4, NN5, NN6, and NN7 comprises a data bus B1, B2, B3, B4, B5, B6, and B7 interconnecting at least a processor P1, P2, P3, P4, P5, P6, and P7, a memory M1, M2, M3, M4, M5, M6, and M7, and a satellite receiver G1, G2, G3, G4, G5, G6, and G7. The network nodes NN1, NN2, NN3, NN4, NN5, NN6 are road-side network nodes, which means that these network nodes are installed in a vehicle or a road infrastructure. The network node NN7 is a network infrastructure node, which means that this node is configured to manage network functions. The satellite receiver G1, G2, G3, G4, G5, G6, and G7 is configured to receive at least one satellite Signal TS, for example a GPS, Global Positioning System, Signal, originating from an earth satellite S. On each of the memory M1, M2, M3, M4, M5, M6, and M7 a computer program is stored, which implements the methods disclosed in this description when executed on the corresponding processor P1, P2, P3, P4, P5, P6, and P7. Alternatively or additionally, the processors P1, P2, P3, P4, P5, P6, and P7 are implemented as ASIC. Each one of the network nodes NN1, NN3 comprises a radio module C1, C3 configured for the transmission and reception of radio signals according to the adhoc radio communications network VANET. Each one of the radio modules C1, C3 is connected to an antenna A1, A3. Each one of the network nodes NN2, NN4 comprises a radio module D2, D4 configured for the transmission and reception of radio signals according to the cell-supported radio communications network CNET. Each one of the radio modules D2, D4 is connected to an antenna A2, A4. Each one of the network nodes NN5, NN6 comprises a radio module D5, D6 configured for the transmission and reception of radio signals according to the cell-supported radio communications network CNET, and a radio module C5, C5 configured for the transmission and reception of radio signals according to the adhoc radio communications network VANET. Each one of the radio modules D5, D6 is connected to an antenna A5$d$, A6$d$. Each one of the radio modules C5, C6 is connected to an antenna A5$c$, A6$c$.

National authorities such as the "Bundesnetzagentur" of the Federal Republic of Germany draw up a frequency usage plan which, for example, includes licenses for the different network operators. The network operator is allowed, under the assigned license, to connect the network infrastructure nodes and network nodes in an assigned licensed frequency range or frequency spectrum. In contrast, there are frequency ranges or frequency spectra which are not assigned to any network operator and can be freely used under certain boundary conditions such as, for example, dedicated transmission/reception power.

The network VANET provides an adhoc radio channel AHCH. The network CNET provides the sidelink radio channel SLCH. Each one of the sidelink radio channel SLCH and the adhoc radio channel AHCH is an instance of wireless medium, WM, use for the purpose of passing physical layer, PHY, protocol data units, PDUs, between two or more network nodes. In both networks VANET and CNET radio signals are transmitted using the same or overlapping unlicensed frequency range uFR. Uncoordinated use of the channels SLCH and AHCH would lead to a deterioration of at least one of both channels SLCH and AHCH.

The network infrastructure node NN7 comprises a network interface 17 for accessing other network nodes for example of a backhaul network. The network infrastructure node NN7 can also be designated as a base Station or eNodeB. The network infrastructure node NN7 is connected to a stationary antenna A7 to send data on a downlink channel DC and to receive data on an uplink channel UC. The antenna A7 comprises, for example, a number of antennas and is designed, for example, as a remote radio head, RRH. Of course, the network infrastructure node NN7 can be realized in a distributed manner, for example in the context of a virtualization, and may consist of a plurality of separated network nodes. The network infrastructure node NN7 and the roadside network nodes NN2, NN4, NN5 and NN6 are configured according to the LTE-V2X standard, for example.

The network infrastructure node NN7 and the antenna A7 provide a radio CL within which the roadside network nodes NN5 and NN4 are in-coverage and are able to communicate with the network infrastructure node NN7. On the other hand, the network nodes NN2 and NN5 do not reside within the radio CL, are out-of-coverage with regard to the network infrastructure node NN7 and are not able to communicate directly with the network infrastructure node NN7.

The sidelink radio channel SLCH and a sidelink in general are defined, for example, by document 3GPP TS 36,300 V14.2.0 (2017-03), which is incorporated herein by reference. The network nodes NN2, NN4, NN5 and NN6 are configured according to 3GPP TS 36.300 V14.2.0 (2017-03). The sidelink includes sidelink discovery, and V2X sidelink communication. The sidelink uses uplink resources and a physical channel structure similar to the uplink. The sidelink thus differs from the uplink with respect to the physical channel.

The sidelink is limited to individual cluster transmission for the sidelink physical channels. Furthermore, the sidelink uses a 1-symbol gap at the end of each sidelink subframe. For V2X sidelink communication, PSCCH, Physical Sidelink Control Channel, and PSSCH, Physical Sidelink Shared Channel, are transmitted in the same subframe.

Physical layer processing of transport channels in the sidelink differs from uplink transmission in the following steps: Scrambling: For PSDCH, Physical Sidelink Discovery Channel, and PSCCH, scrambling is not specific to the network entity; Modulation: 64 QAM and 256 QAM are not supported for the Sidelink (QAM: Quadrature amplitude modulation). The PSCCH indicates sidelink resources and other transmission parameters used by the respective network node for the PSSCH.

For PSDCH, PSCCH and PSSCH demodulation, reference signals similar to the uplink demodulation reference signals in the 4th symbol of the slot are transmitted in the normal CP, Cyclic Prefix, and in the third symbol of the slot in the extended CP. The sidelink demodulation reference signal sequence length corresponds to the size (number of subcarriers) of the associated resource. For V2X Sidelink communication, reference signals are transmitted in the 3rd and 6th symbols of the first slot and in the 2nd and 5th symbols of the second slot in the CP. For PSDCH and PSCCH, reference signals are generated based on a fixed base sequence, cyclic shift and orthogonal cover code. For V2X sidelink communication, the cyclic shift for PSCCH is randomly selected on each transmission.

For measurements of the sidelink radio channel, the following options are available on the side of the network nodes: Receiving power of the sidelink reference signal (S-RSRP); Receive power of the sidelink discovery reference signal (SD-RSRP); Received power of the PSSCH reference signal (PSSCH-RSRP); Signal strength indicator for Sidelink reference Signals (S-RSSI).

A sidelink resource pool can be provided pre-configured, semi-static, or dynamically and corresponds to a set of radio resources capable of performing a sidelink transmission via the sidelink radio channel SLCH. A network node performing sidelink communication in a mode 2 (uncovered case) autonomously selects a resource from a resource pool range, which is configured by the network infrastructure node NN7 or a headend of a sidelink cluster in advance. A network node performing sidelink communication in a mode 1 (covered case) selects a resource which has been scheduled by the network infrastructure node NN7.

Each one of network nodes NN1, NN3, NN5, NN6 is configured, for example, according to the IEEE 802.11p standard, especially IEEE 802.11p-2010 dated Jul. 15, 2010 which is incorporated by reference. The IEEE 802.11p PHY and MAC provide services for upper layer protocols for Dedicated Short-Range Communications, DSRC, in the US and for Cooperative ITS, C-ITS, in Europe. The network nodes NN1, NN3, NN5, NN6 communicate directly with each other via an adhoc radio channel AHCH in the unlicensed frequency range. The adhoc radio channel AHCH is arbitrated via a CSMA/CA (Carrier Sense Multiple Access/Collision Avoidance) protocol by radio modules C1, C3, C5, C6.

The network node NN1 is configured to transmit data via the adhoc radio channel AHCH and the network node NN3 can receive the data. All network nodes in the reception range of the radio signal as for example the network node NN3 are able to receive such data. The adhoc radio channel AHCH and an adhoc radio channel in general and the ad hoc wireless communication network VANET are described, for example, by the IEEE Standard "802.11p-2010-IEEE Standard for Information Technology-Local and Metropolitan Area Networks-" Specific Part 11: Wireless LAN Medium Access Control (MAC) and Physical Layer (PHY) Specifications Amendment 6: Wireless Access in Vehicular Environments, which is incorporated herein by reference. IEEE 802.11p is a Standard for extending the WLAN Standard IEEE 802.11. The goal of IEEE 802.11p is to establish wireless technology in passenger vehicles and to provide a reliable interface for Intelligent Transport Systems (ITS) applications. IEEE 802.11p is also the basis for Dedicated Short Range Communication (DSRC) in the 5.85 to 5.925 GHz band. To avoid confusion with the European DSRC Version, the term ITS-G5 is used rather than DSRC, especially in Europe.

To access the adhoc radio channel AHCH the network node NN1, NN3, NN5 and NN6 use an enhanced distributed channel access, EDCA, and a listen-before-talk, LBT, procedure. The LBT comprises a backoff procedure prior to transmitting on the adhoc radio channel AHCH. First the network node NN1, NN3, NN5 or NN6 listens and waits until the adhoc radio channel AHCH is available during a period of time, the period of time AIFS being termed as arbitration inter-frame space AIFS. The adhoc radio channel AHCH is sensed idle if a power level is lower than a first threshold value like 62 dBm and no adhoc preamble with a power level higher than a second threshold value like −82 dBm is determined. The adhoc radio channel is busy if the channel is not sensed idle.

If the adhoc radio channel AHCH is sensed idle during the period of time AIFS, the backoff procedure starts. A backoff timer is initialized as a random number being multiples of a 9 μs slot time. The random number is determined within a contention window. The random backoff timer is decreased by one when the adhoc radio channel AHCH is sensed idle. For each slot time the adhoc radio channel AHCH is sensed busy the random backoff timer remains with the same value as before.

The network node NN1, NN3, NN5 or NN6 obtains a transmission opportunity TXOP if the backoff timer expires. If the network node NN1, NN3, NN5 or NN6 senses the adhoc radio channel as idle, it will transmit the data, if a transmission opportunity TXOP duration has not expired.

The receiving network node among the network nodes NN1, NN3, NN5, and NN6 will send an acknowledgment to the sending node upon reception of the data if the data was not transmitted in a broadcast mode.

The document "ETSI EN 302 663 V1.2.0 (2012-11)", which is incorporated herein by reference, describes both lowermost layers of ITS-G5 technology (ITS G5: Intelligent Transport Systems operating in the 5 GHz frequency band), the physical layer and the data link layer. The radio modules C1, C3, C5, and C6 realize, for example, these two lowest layers and corresponding functions according to "ETSI TS 102 687 V1.1.1 (2011-07)" in order to use the adhoc radio channel. The following unlicensed frequency bands are available in Europe for the use of the adhoc radio channel AHCH, which are part of the unlicensed frequency band NLFB: 1) ITS-G5A for safety-relevant applications in the frequency range 5.875 GHz to 5.905 GHz; 2) ITS-G5B for non-safety related applications in the frequency range 5,855 GHz to 5,875 GHz; and 3) ITS-G5D for the operation of ITS applications in the 5.055 GHz to 5.925 GHz frequency range. ITS-G5 allows communication between the two network units UE1 and UE2 out of the context of a base station. The ITS-G5 enables the immediate exchange of data frames and avoids the management overhead that is used when setting up a network.

The document "ETSI TS 102 687 V1.1.1 (2011-07)", which is incorporated herein by reference, describes for ITS-G5 a "Decentralized Congestion Control Mechanism". Among other things, the adhoc radio channel AHCH serves to exchange traffic safety and traffic efficiency data. The radio modules C1, C3, C5, and C6 realize, for example, the functions as described in the document "ETSI TS 102 687 V1.1.1 (2011-07)". The applications and services in the ITS-G5 are based on the cooperative behavior of the roadside network nodes that make up the adhoc network VANET (VANET: vehicular ad hoc network). The adhoc network VANET enables time-critical road traffic applications that require rapid information exchange to alert and assist the driver and/or vehicle in good time. To ensure proper functioning of the adhoc network VANET, "Decentralized Congestion Control Mechanisms" (DCC) is used for the adhoc radio channel AHCH of ITS-G5. DCC has features that reside on multiple layers of the ITS architecture. The DCC mechanisms are based on knowledge about the channel. The channel state information is obtained by channel probing. Channel state information can be obtained by the methods TPC (transmit power control), TRC (transmit rate control) and TDC (transmit data rate control). The methods determine the channel state information in response to received signal level thresholds or preamble information from detected packets.

The adhoc radio communications network VANET and the cell-supported radio communications network CNET differ in various aspects—Differences between both technologies are already present in the coding/decoding chain, therefore in modulation and coding schemes. This does not allow a successful decoding of a received signal of the other technology. Different reference symbols are used in a different way: sidelink reference symbols are transmitted at certain radio resources during a transmission via the sidelink radio channel SLCH. On the other hand, adhoc reference symbols are transmitted at the beginning of a transmission via the adhoc radio channel AHCH. Moreover, the transmission via the sidelink radio channel SLCH requires that the participating network nodes are synchronized in time in order to correctly decode the received signal. The adhoc radio channel on the other hand allows connectionless, unsynchronized transmission of signals.

In the shown traffic situation the network nodes NN1 to NN6 are located such, that the radio power of each network nodes NN1 to NN6 is sufficient to reach another one of the network nodes NN1 to NN6. Thus, transmissions on the channels AHCH and SLCH which overlap in frequency can adversely affect each other. One aim of this description is to reduce this disadvantageous mutual influence.

For example, the vehicle V5 is an emergency vehicle in emergency operation and communicates its emergency status in a message M5T via the adhoc radio channel ADCH and the sidelink radio channel to the traffic light TL. The network node NN5 is configured to transmit a message via the sidelink radio channel SLCH and/or via the adhoc radio channel AHCH, which can be received by the network node NN6. As both network nodes NN5 and NN6 comprise the radio modules C5, D5, C6, D6 for both networks CNET and VANT, the access to both technologies is possible. The network nodes NN5 and NN6 can also be termed gateway nodes. The sidelink radio channel SLCH between the network nodes NN5 and NN6 is operated in the distributed mode.

In dependence of the received message the traffic light TL closes the crossing for cross traffic. Upon switching to red the traffic light communicates its red-light status in a message MT1 via the adhoc radio channel AHCH to the vehicle V1 in order to reduce its speed. The vehicle V1 moves with a speed of 100 km/h and communicates the speed in a message M13 via the adhoc radio channel ADCH to the other vehicle, e.g., vehicle V3.

The network node NN2 is configured to transmit a message M2T via the sidelink radio channel SLCH to the network node NN6. As both network nodes NN2 and NN6 reside outside the radio cell CL, the access to the sidelink radio channel SLCH is not controlled by a network infrastructure node. The sidelink radio channel SLCH between the network nodes NN2 and NN6 is operated in the distributed mode.

The network node NN4 is configured to transmit a message M45 via the sidelink radio channel SLCH to the network node NN5. As both network nodes NN4 and NN5 reside in the radio cell CL, the access to the sidelink radio channel is controlled by the network infrastructure node NN7. The sidelink radio channel SLCH between the network nodes NN4 and NN5 is operated in mode 1 or managed mode, which means that the network infrastructure node NN7 controls the transmission on the sidelink radio channel SLCH via corresponding scheduling assignments SA in the downlink channel DC. The network infrastructure node NN7 comprises a scheduler which determines the scheduling assignments SA for the sidelink radio channel SLCH. The scheduling assignments SA are control signals transmitted via the downlink channel DC and indicate which sidelink radio resource are to be used by the network nodes NN4, NN5 to transmit the data via the sidelink. The scheduling assignments SA are determined in such a way that collisions are avoided and interference is minimized. This is of great importance under high network load, as the scheduler entity is able to guarantee a Quality-of-Service (QoS), e.g., data rate, data reliability, packet error ratio, or delay, to different applications by allocating sidelink radio resources to each network node NN4, NN5 based on the service quality requirements of the application. The data transmissions associated with the scheduling assignments SA can occupy adjacent resource blocks RB in the same sub-frame or non-adjacent RBs depending on the latency required by the application. The scheduling and the control by the network infrastructure node NN7 can only be performed in areas where the Signals of the node NN7 are available (in-coverage). In this mode the scheduling and interference management of radio traffic is assisted by the network infrastructure node NN7 via control signaling over the downlink channel DC. The network infrastructure node NN7 assigns for each network node the resources (ea. time and frequency ranges) to be used for the sidelink in a dynamic manner.

Since services should be available everywhere including areas where no network coverage by a network infrastructure node NN7 is available, there is a further configuration or deployment mode for the sidelink radio channel SLCH, namely the distributed mode. In the distributed mode the scheduling and interference management of radio traffic is supported based on distributed algorithms implemented between the network nodes, for example NN2 and NN5. These distributed algorithms are based on sensing with semi-persistent transmission based on the fact that the radio traffic generated by each network node NN2, NN5 is mostly periodic in nature. This technique enables sensing the occupation of a radio resource and estimate the future congestion on it. This optimizes the use of the sidelink by enhancing resource separation between transmitters that are using overlapping resources. Additionally, a mechanism where resource allocation is dependent on geographical information is able to reduce the number of network nodes competing for the same resources which reduces the collision probability. The distributed mode is mainly used in out-of-coverage scenarios and designated also as non-cell-supported mode. Consequently, the cell-supported communications network CNET provides the cell-supported mode (in-coverage) and the distributed mode (out-of-coverage). Even out-of-coverage the network CNET is termed cell-assisted radio communications network.

Both modes are defined to use a dedicated carrier for radio communications, meaning the spectrum band is only used for the direct side-link based V2V communications. The design is scalable for different bandwidths (e.g., 10 MHz or multitudes of 10 MHz). For time synchronization GNSS, Global Navigation Satellite System, is used in both cases.

In this description, reference is made to a single uplink channel and a single downlink channel. For example, the uplink channel and the downlink channel include respective subchannels. Several channels can be used in the uplink as well as in the downlink. The same applies to the sidelink radio channel SLCH and the adhoc radio channel AHCH.

Figures 2, 3:
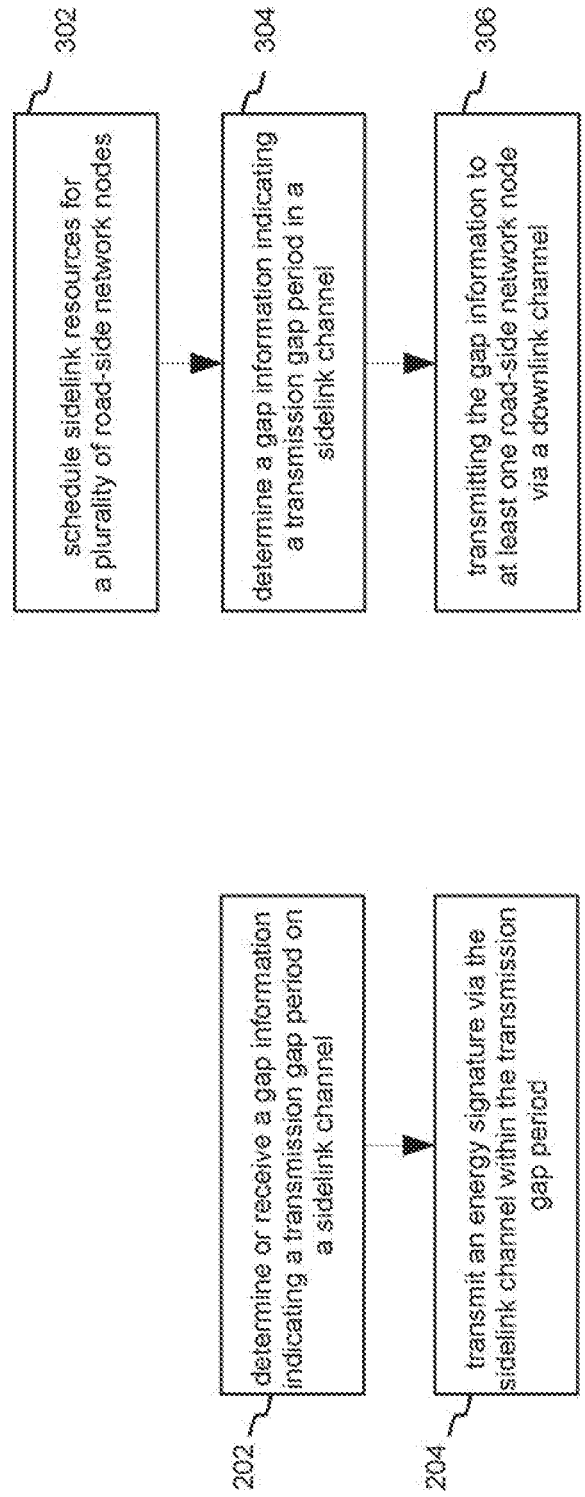
FIG. 2 depicts a schematic flow chart to operate a road-side network node.
FIG. 3 depicts a schematic flow chart to operate a network infrastructure network node.

FIG. 2 depicts a schematic flow chart to operate one of the road-side network nodes NN2, NN4, NN5 or NN6 of the network CNET of FIG. 1. In a Step 202 a gap information is determined or received, wherein the gap information indicates a transmission gap period on the sidelink channel. Ina step 204 an energy signature is transmitted via the sidelink radio channel within the transmission gap period determined or received in step 202.

FIG. 3 depicts a schematic flow chart to operate the network infrastructure network node NN7 of FIG. 1. In a step 302 sidelink resources are scheduled for a plurality of road-side network nodes. In a step 304 the gap information indicating the transmission gap period in the sidelink radio channel is determined. The step 304 includes a determination of the gap information in dependence on the scheduled sidelink resources and in dependence on the resource pool, the resource pool comprising sidelink resources exclusively reserved for scheduling on the sidelink. The gap information can be determined by XOR-ing the scheduled sidelink resources and the resource pool. In a step 306 the gap information is transmitted to at least one road-side network node via the downlink channel DC. The road-side network node receives the gap information from the network infrastructure node and transmits the energy signature according to step 204 of FIG. 2.

Figure 4:
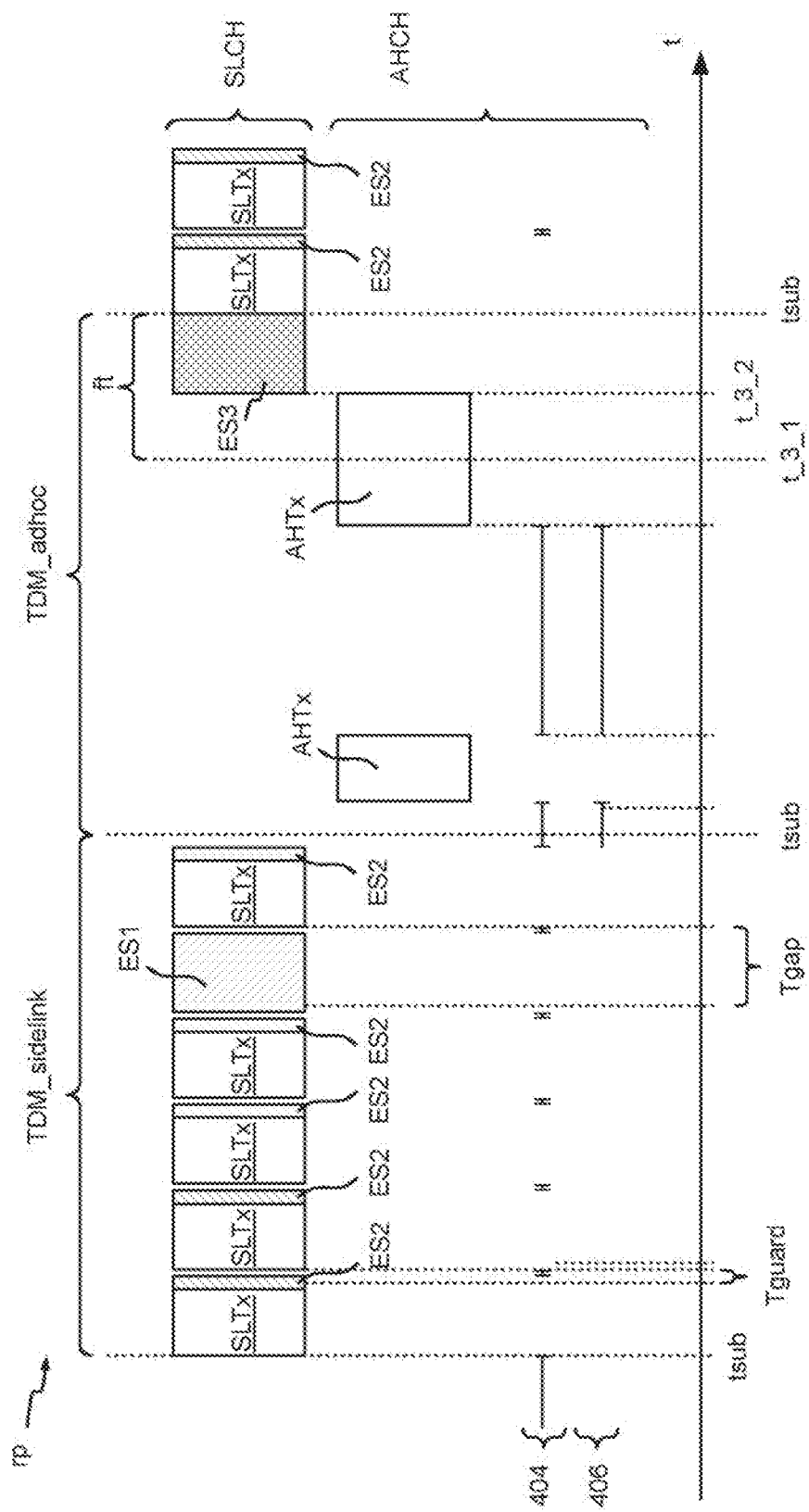
FIG. 4 depicts a schematic diagram of transmission via a sidelink channel and an adhoc radio channel.

FIG. 4 depicts a schematic diagram of transmission via the sidelink radio channel and the adhoc radio channel over time t. The resource pool rp comprises the information about a sidelink TDM-channel and an adhoc TDM-channel (TDM: time division multiplex), each comprising time slices indicating an exclusive reservation for the respective channel.

Therefore, the resource pool rp comprises set of radio resources, which are available for sidelink radio channel transmission and the adhoc radio channel transmission in a time division multiple access manner.

The blocks SLTx indicate a transmission via the sidelink radio channel SLCH and the blocks AHtx indicate a transmission via the adhoc radio channel AHCH. After a sidelink radio channel transmission SLTx. According to section 404 one of the network nodes accessing the adhoc radio channel will sense the medium as idle. Section 406 illustrates that when the backoff-timer of the listen-before-talk procedure reaches Zero, the network node will transmit data via the adhoc radio channel AHCH according to the blocks SLTx.

During the sidelink time slices of the sidelink TDM-channel TDM_sidelink each one of the sidelink capable network nodes will determine that a time slice is available for transmitting via the sidelink radio channel. Gap information is determined or received only during a time slice of the sidelink TDM-channel. A TDM-channel is different from a radio channel in the sense that the radio channel is used to transmit data via physical radio resources. The TDM-channel provides time slices of the physical radio resources being available for the sidelink radio channel or the adhoc radio channel.

One of sidelink capable network nodes receives or determines the gap information about the gap period Tgap and transmits the first energy signature ES1 during the gap period Tgap. One of sidelink capable network nodes determines a start of a guard period Tguard towards the end of a subframe. A second energy signature ES2 is transmitted during the guard period Tguard. One of sidelink capable network nodes determines the non-sidelink time according to an adhoc TDM-channel TDM adhoc. During the non-sidelink time-slice one of sidelink capable network nodes Starts to listen the sidelink radio channel SLCH from a time t_3_1 on. The time t_3_1 is determined as the subsequent subframe border tsub minus an adhoc frame time ft, which can be determined a maximum or mean frame time on the adhoc radio channel. Then the sidelink radio channel is determined as idle, the sidelink capable network node begins to transmit a third energy signature ES3 until an end of the non-sidelink time slice when the sidelink radio channel gets idle.

The energy signature ES1, ES2, or ES3 is sent via one, a plurality of or all subchannels of the sidelink radio channel SLCH. In an embodiment the first, second and third energy signatures are white band noise. In another embodiment the first energy signature comprises an a-priori known signature and the second and third signatures are white band noise.

Figure 5:
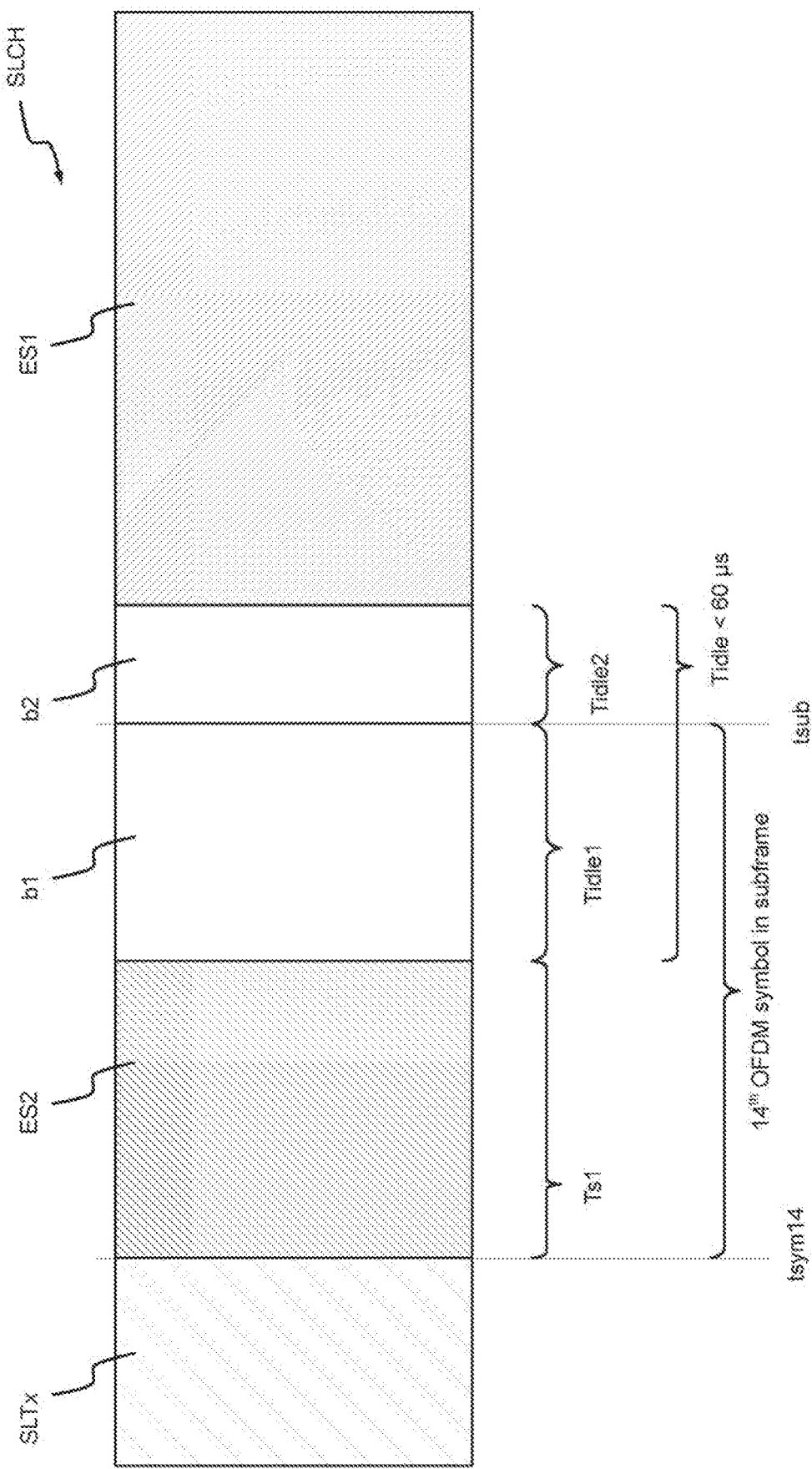
FIG. 5 depicts a schematic data transmission diagram via the sidelink channel.

FIG. 5 depicts a schematic data transmission diagram via the sidelink radio channel when accessing the sidelink TDM-channel. A sidelink capable network node determines a start tsub of a subframe of the sidelink radio channel SLCH. During the time period Tidle2 the network node determines whether the sidelink radio channel SLCH is idle. If the sidelink radio channel SLCH is still idle at the end of the time period Tidle2, the network node start to transmit the first energy signature ES1 until the end of the subframe. The time period Tidle 2 is determined to 30 µs, in particular to 20 µs, and in particular to 15 µs.

One of the sidelink capable network nodes determines the Start tsym14 of the guard period, which is arranged in the 14th OFDM Symbol at the end of a subframe, and transmits the second energy signature ES during a time period Ts1 within the guard period. The time period Ts1 starts at the start tsym14 of the 14th OFDM symbol and ends after 40 µs as shown. The idle time Tidle of the idle block b1 between the first and second energy signatures ES1 and ES2 is smaller than 100 µs, preferably smaller than 80 µs, preferably smaller than 60 µs, and preferably smaller than 58 µs. In the shown example Tidle 1 until the subframe border tsub is 40 µs, Tidle 2 of idle block b2 from the subframe border until the start of the energy signature ES1 is 20 µs. Ts1 is 60 µs in the example.

Figure 6:
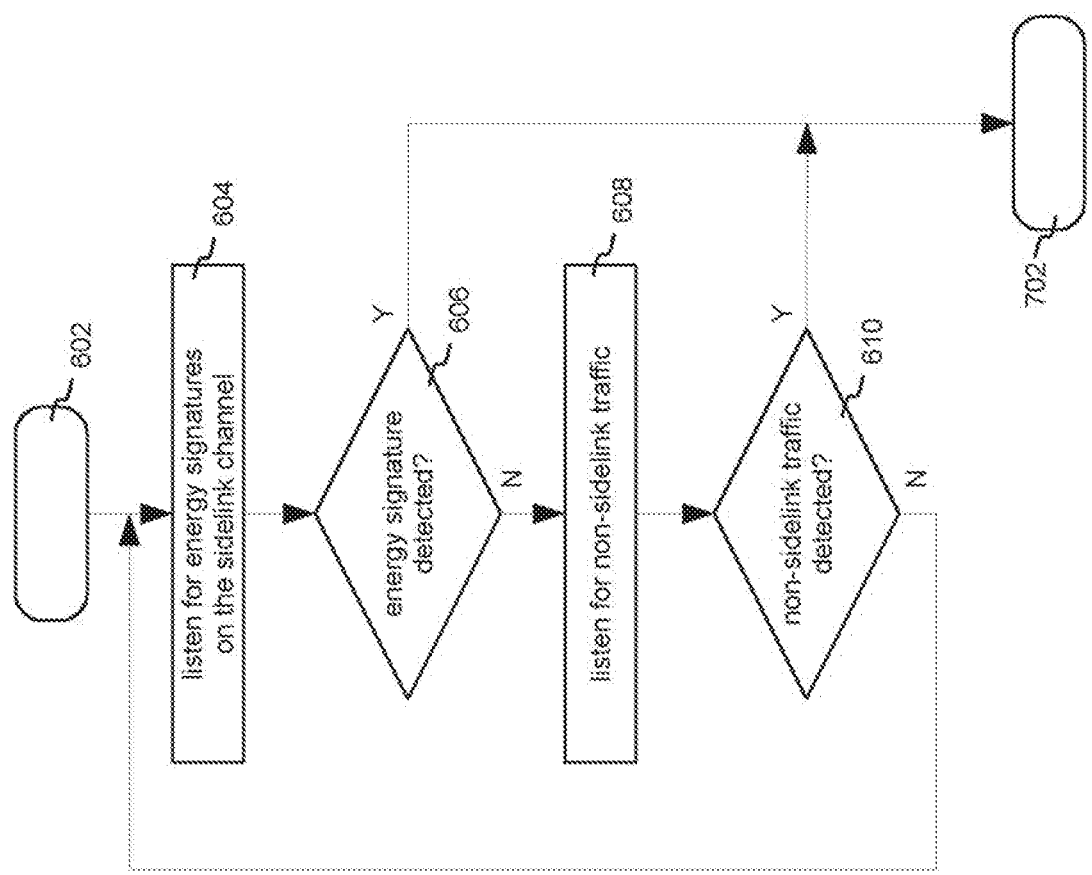
FIG. 6 depicts a schematic flow chart to operate the road-side network node.

FIG. 6 depicts a schematic flow chart to operate the sidelink-capable road-side network node. The procedure start at step 602 with the assumption that no adhoc capable nodes are transmitting in the vicinity of the first sidelink capable road-side network node (sidelink-only mode). In a step 604 the network node listens for first energy signatures on the sidelink radio channel. If the energy signature with the a-priori known signature is detected the procedure continues with a step 702 switching to a shared spectrum mode. If no energy signature has been detected a step 608 provides a listing for non-sidelink traffic. If non-sidelink traffic is detected the procedure continues with the step 702, otherwise with step 604.

FIG. 7 depicts a schematic flowchart to operate the first road-side network node in the shared spectrum mode. After starting with the step 702, a step 704 checks whether the radio medium is presently in the sidelink TDM-channel. If so, a determination is made in a step 706 whether a start of a subframe has been reached. If so, the sidelink-capable network node listens in a step 708 on the sidelink radio channel. In a step 710 a state of the sidelink radio channel is determined. If the sidelink radio channel is idle, then the first energy signature is transmitted in a Step 712. If the sidelink radio channel is busy, then the network node waits until the start of the 14th OFDM-symbol in Step 714 and starts transmitting the second energy signature in step 716. It is checked in step 718 whether the network node enters an area without non-sidelink communication in the vicinity. If positive, the procedure continues with step 602 of FIG. 6. If negative, the procedure continues with step 704.

According to an embodiment of step 712, a transmission probability is determined randomly, a threshold is determined in dependence on the number of further road-side network nodes of the cell-supported radio communications network in the vicinity of the road-side network node, and the first energy signature is transmitted via the sidelink radio channel within the transmission gap period only if the transmission probability is above the threshold.

A time slice of a non-sidelink TDM-channel is determined in the step 704 and a step 720 awaits the time for starting listening the sidelink radio channel in step 722. Upon the sidelink radio channel sensed idle in step 724, the network node starts the transmission of the third energy signature in a step 726.

In connection with FIG. 1 a network setup is provided, the network setup comprising: the cell-supported radio communications network CNET with the road-side sidelink-capable network nodes NN1, NN3, NN5 and NN6, and the adhoc radio communications network VAN ET with the road-side network nodes NN2, NN4, NN5, NN6, and NN7. The road-side adhoc-capable network nodes NN1, NN3, NN5 and NN6 sense a non-idle state of the adhoc radio channel during a transmission of data signals and/or energy signatures via the sidelink radio channel SLCH. When one of the network nodes NN1, NN3, NN5 and NN6 senses an idle state of the adhoc radio channel it will apply its Listen-Before-Talk, LBT, procedure and transmit data via the adhoc radio channel ADCH.

The invention claimed is:

1. A road-side network node for operating in a cell-supported radio communications network, the road-side network node comprising:
   a processor;
   a memory;
   a radio module; and
   an antenna;
   wherein:
      the road-side network node is configured to:
         determine or receive a gap information indicating a transmission gap period on a sidelink radio channel; and
         transmit an energy signature via the sidelink radio channel within the transmission gap period; and
      at least one of the following two features (I)-(II):
         (I) the energy signature is an a-priori known signature; and
         (II) the road-side network node is configured to perform any one or more of the following six features (1)-(5):
            (1) (a) determine a sidelink TDM-channel in dependence on a resource pool, the sidelink TDM-channel being exclusively reserved for communication via the sidelink radio channel, and (b) determine the gap information only during the sidelink TDM-channel;
            (2) determine (a) a start of a subframe of the sidelink radio channel, and (b) whether the sidelink radio channel is idle after the start of the subframe, the energy signature being transmitted upon determining the sidelink radio channel is idle after the start of the subframe;
            (3) (a) determine randomly a transmission probability, and (b) determine a threshold in dependence on a number of further road-side network nodes of the cell-supported radio communications network in a vicinity of the road-side network node, the energy signature being transmitted via the sidelink radio channel within the transmission gap period only if the transmission probability is above the threshold;
            (4) (a) determine a start of a guard period towards an end of a subframe of the sidelink radio channel, and (b) transmit a second energy signature during the guard period; and
            (5) (a) determine a non-sidelink TDM-channel in dependence on the resource pool, wherein the non-sidelink TDM-channel is exclusively reserved for communication via the sidelink radio channel, (b) start listening to the sidelink radio channel before an end of a time-slice of the non-sidelink TDM-channel, (c) determine whether the sidelink radio channel is idle, and (d) transmit another energy signature until an end of the time slice of the non-sidelink TDM-channel when the sidelink radio channel gets idle.

2. The road-side network node according to claim 1, wherein the road-side network node is configured to:
   determine the sidelink TDM-channel in dependence on the resource pool, the sidelink TDM-channel being exclusively reserved for communication via the sidelink radio channel; and
   determine the gap information only during the sidelink TDM-channel.

3. The road-side network node according to claim 1, wherein the road-side network node is configured to:
   determine the start of the subframe of the sidelink radio channel; and
   determine whether the sidelink radio channel is idle after the start of the subframe, the energy signature being transmitted upon determining the sidelink radio channel is idle after the start of the subframe.

4. The road-side network node according to claim 3, wherein the road-side network node is configured to:
   determine that the sidelink radio channel is idle for at least 30 µs beginning with the start of subframe;
   start the transmission of the energy signature upon determining the sidelink radio channel is idle for the at least 30 µs since the start of the subframe.

5. The road-side network node according to claim 3, wherein the road-side network node is configured to:
   determine that the sidelink radio channel is idle for at least 20 µs beginning with the start of subframe;
   start the transmission of the energy signature upon determining the sidelink radio channel is idle for the at least 20 µs since the start of the subframe.

6. The road-side network node according to claim 3, wherein the road-side network node is configured to:
   determine that the sidelink radio channel is idle for at least 15 µs beginning with the start of subframe;
   start the transmission of the energy signature upon determining the sidelink radio channel is idle for the at least 15 µs since the start of the subframe.

7. The road-side network node according to claim 1, wherein the road-side network node is configured to:
   receive the gap information via a downlink channel from a network infrastructure node.

8. The road-side network node according to claim 1, wherein the road-side network node is configured to:
   determine randomly the transmission probability; and
   determine the threshold in dependence on the number of further road-side network nodes of the cell-supported radio communications network in the vicinity of the road-side network node, the energy signature being transmitted via the sidelink radio channel within the transmission gap period only if the transmission probability is above the threshold.

9. The road-side network node according to claim 1, wherein the energy signature is the a-priori known signature.

10. The road-side network node according to claim 1, wherein the road-side network node is configured to:
    determine the start of the guard period towards the end of the subframe of the sidelink radio channel; and
    transmit second energy signature during the guard period.

11. The road-side network node according to claim 10, wherein a time period starting at the end of the transmission of the second energy signature and ending at a start of the transmission of the subsequent energy signature is smaller than 100 µs.

12. The road-side network node according to claim 10, wherein a time period starting at the end of the transmission of the second energy signature and ending at a start of the transmission of the subsequent energy signature is smaller than 80 µs.

13. The road-side network node according to claim 10, wherein a time period starting at the end of the transmission of the second energy signature and ending at a start of the transmission of the subsequent energy signature is smaller than 60 µs.

14. The road-side network node according to claim 10, wherein a time period starting at the end of the transmission of the second energy signature and ending at a start of the transmission of the subsequent energy signature is smaller than 58 µs.

15. The road-side network node according to claim 1, wherein the road-side network node is configured to:
determine the non-sidelink TDM-channel in dependence on the resource pool, wherein the non-sidelink TDM-channel is exclusively reserved for the communication via the sidelink radio channel;
start listening to the sidelink radio channel before the end of the time-slice of the non-sidelink TDM-channel;
determine whether the sidelink radio channel is idle; and
transmit the other energy signature until the end of the time slice of the non-sidelink TDM-channel when the sidelink radio channel gets idle.

16. A method to operate a road-side network node for operating in a cell-supported radio communications network, the method comprising the following steps:
determining or receiving a gap information indicating a transmission gap period on a sidelink radio channel; and
transmit an energy signature via the sidelink radio channel within the transmission gap period;
wherein at least one of the following two features (I)-(II):
(I) the energy signature is an a-priori known signature; and
(II) the method further comprises performing anyone or more of the following six steps (1)-(6):
(1) determining a sidelink TDM-channel in dependence on a resource pool, the sidelink TDM-channel being exclusively reserved for communication via the sidelink radio channel, the gap information being determined, the determination of the gap information occurring only during the sidelink TDM-channel;
(2) determining (a) a start of a subframe of the sidelink radio channel, and (b) whether the sidelink radio channel is idle after the start of the subframe, the energy signature being transmitted upon determining the sidelink radio channel is idle after the start of the subframe;
(3) (a) determining randomly a transmission probability, and (b) determining a threshold in dependence on a number of further road-side network nodes of the cell-supported radio communications network in a vicinity of the road-side network node, the energy signature being transmitted via the sidelink radio channel within the transmission gap period only if the transmission probability is above the threshold;
(4) (a) determining a start of a guard period towards an end of a subframe of the sidelink radio channel, and (b) transmitting a second energy signature during the guard period; and
(5) (a) determining a non-sidelink TDM-channel in dependence on the resource pool, wherein the non-sidelink TDM-channel is exclusively reserved for communication via the sidelink radio channel, (b) starting listening to the sidelink radio channel before an end of a time-slice of the non-sidelink TDM-channel, (c) determining whether the sidelink radio channel is idle, and (d) transmitting another energy signature until an end of the time slice of the non-sidelink TDM-channel when the sidelink radio channel gets idle.

17. A network infrastructure node for operating in a cell-supported radio communications network, the network infrastructure node comprising:
a processor;
a memory;
a radio module; and
an antenna;
wherein the network infrastructure node is configured to:
schedule sidelink resources for a plurality of road-side network nodes;
determine a gap information indicating a transmission gap period in a sidelink radio channel, the determination being made in dependence on the scheduled sidelink resources and in dependence on a resource pool, the resource pool including sidelink resources exclusively reserved for scheduling on the sidelink radio channel; and
transmit the gap information to at least one of the road-side network nodes via a downlink channel.

18. The network infrastructure node according to claim 17, wherein the network infrastructure node is configured to determine the gap information by XOR-ing the scheduled sidelink resources and the resource pool.

19. A method to operate a network infrastructure node of a cell-supported radio communications network, the method comprising the following steps:
scheduling sidelink resources for a plurality of road-side network nodes;
determining a transmission gap period in a sidelink radio channel, the determination being made in dependence on the scheduled sidelink resources and in dependence on a resource pool, the resource pool including sidelink resources exclusively reserved for scheduling on the sidelink radio channel; and
transmitting the gap information to at least one road-side network node via a downlink channel.

20. A network setup, comprising:
a cell-supported radio communications network with road-side network nodes, each of the road-side network nodes including a processor, a memory, a radio module, and an antenna, wherein each of the road-side network node is configured to:
determine or receive a gap information indicating a transmission gap period on a sidelink radio channel, and
transmit an energy signature via the sidelink radio channel within the transmission gap period; and
an adhoc radio communications network with second road-side network nodes, wherein an adhoc radio channel of the adhoc radio communications network and the sidelink radio channel of the cell-supported radio communications network overlap at least partly in frequency, wherein each of the second road-side network nodes are configured to:
sense a non-idle state of the adhoc radio channel during a sequential transmission of data signals and/or blocking signals via the sidelink radio channel;
sense an idle state of the adhoc radio channel; and
transmit a data signal via the adhoc radio channel if the adhoc radio channel is sensed as being idle.

* * * * *